(12) United States Patent
Ooi et al.

(10) Patent No.: US 7,050,198 B2
(45) Date of Patent: May 23, 2006

(54) COMMUNICATION TERMINAL APPARATUS WITH E-MAIL ADDRESS INPUT FUNCTION

(75) Inventors: Yoshikatsu Ooi, Habikino (JP); Tatsuya Nishio, Nara (JP); Keisuke Hasegawa, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 730 days.

(21) Appl. No.: 09/822,245

(22) Filed: Apr. 2, 2001

(65) Prior Publication Data
US 2001/0028469 A1    Oct. 11, 2001

(30) Foreign Application Priority Data
Apr. 7, 2000    (JP)    ............... P2000-106667

(51) Int. Cl.
*B41B 1/00*    (2006.01)
(52) U.S. Cl. .............. 358/1.9; 358/1.15; 358/1.16; 358/402; 358/426.09; 358/426.1; 358/444; 709/245; 455/466
(58) Field of Classification Search ........... 709/245; 358/1.15, 402; 455/466
See application file for complete search history.

(56) References Cited

U.S. PATENT DOCUMENTS

| 6,151,507 | A | * | 11/2000 | Laiho et al. | ................ | 455/466 |
| 6,557,045 | B1 | * | 4/2003 | Tsukui et al. | ............... | 709/245 |
| 6,594,032 | B1 | * | 7/2003 | Hiroki et al. | .............. | 358/1.15 |
| 6,897,985 | B1 | * | 5/2005 | Toyoda | ....................... | 358/402 |

FOREIGN PATENT DOCUMENTS

JP    11-55450 A    2/1999

* cited by examiner

*Primary Examiner*—Kimberly Williams
*Assistant Examiner*—Satwant Singh
(74) *Attorney, Agent, or Firm*—Nixon & Vanderhye, PC

(57) ABSTRACT

A communication terminal capable of sending e-mail is described in which a complete e-mail address of an e-mail recipient is specified by combining one or more e-mail address parts with two or more e-mail address parts designated by making a selection from a display of partial e-mail addresses.

8 Claims, 11 Drawing Sheets

FIG. 3
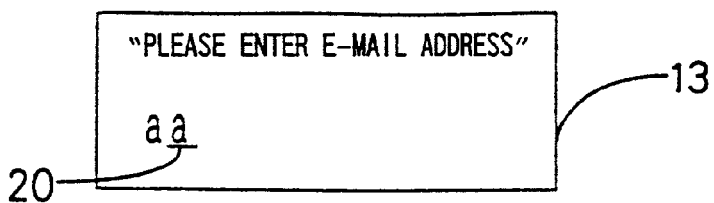
FIG. 4A
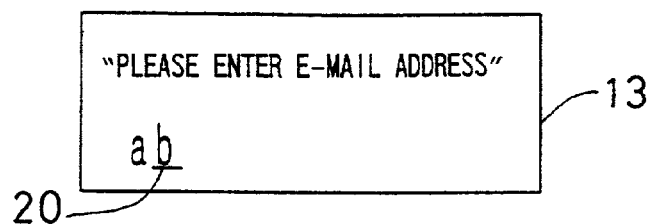
FIG. 4B
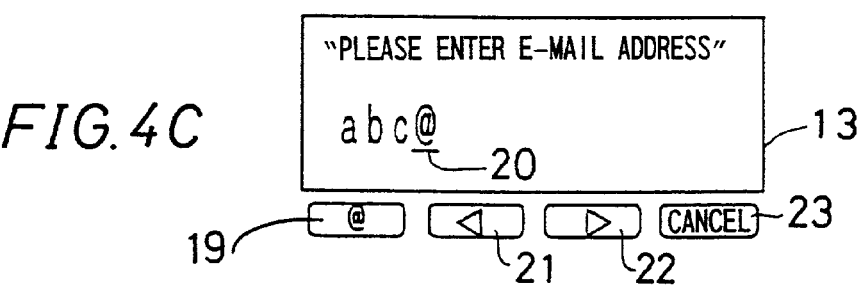
FIG. 4C
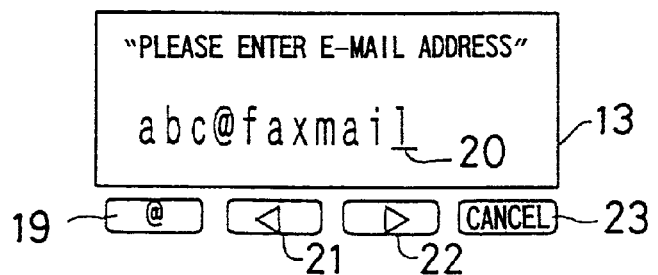
FIG. 4D
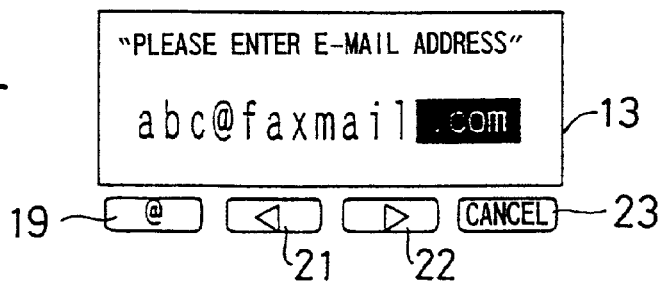
FIG. 4E

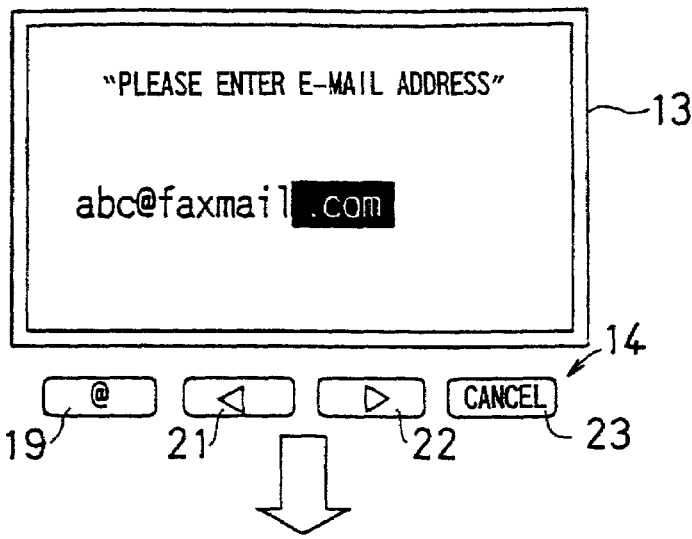
FIG.5A
FIG.5B
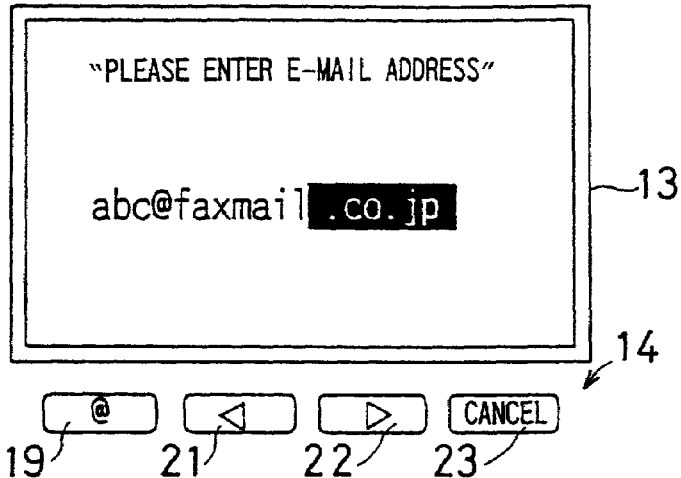
FIG. 6
| FIRST CATEGORY | | SECOND CATEGORY | | THIRD CATEGORY | |
|---|---|---|---|---|---|
| PRIORITY RANK | DISPLAY | PRIORITY RANK | DISPLAY | PRIORITY RANK | DISPLAY |
| 1 | .com | 1 | faxmail.co.jp | 1 | abc@faxmail.co.jp |
| 2 | .co.jp | 2 | open.ne.jp | 2 | info@open.ne.jp |
| 3 | .ne.jp | 3 | pj1.compa.co.jp | 3 | rent@pj1.compa.co.jp |
| 4 | .or.jp | 4 | nikoniko.or.jp | 4 | staff@nikoniko.or.jp |
| 5 | none | 5 | none | 5 | none |

○○○○@××××.com
○○○○@××××.co.jp
○○○○@××××.ne.jp
○○○○@××××.or.jp

○○○○@××××,co.jp

COMMUNICATION TERMINAL APPARATUS WITH E-MAIL ADDRESS INPUT FUNCTION

BACKGROUND OF THE INVENTION

1. Field of the Invention

The present invention relates to a communication terminal apparatus provided with a function for sending and receiving electronic mail, which can be connected to a data communication network, such as the internet.

2. Description of the Related Art

When sending electronic mail using a data communication network such as the internet, the electronic mail can be sent to the intended recipients by specifying mail addresses that are assigned individually to individual persons. Personal computers are commonly used as a means for sending electronic mail, but in recent years, for example mobile phones and facsimile apparatuses are also capable of sending and receiving electronic mail, and their numbers are rising. To send electronic mail with a mobile phone, the e-mail message and the mail address of the recipient are entered with the dial buttons for the input of telephone numbers. With facsimile apparatuses, the e-mail message and the mail address of the recipient are entered with the dial buttons, as with a mobile phone. With facsimile apparatuses, it is also possible to send document images that have been scanned in with a document scanning section to facsimile apparatuses or personal computers on the receiving side. Such a facsimile apparatus for sending and receiving electronic mail is disclosed in Japanese Unexamined Patent Publication JP-A 11-55450 (1999)

FIG. 11 shows an input section 1 and a display section 2 of a conventional communication terminal apparatus. FIGS. 12A to 12E illustrate a conventional method for entering an e-mail address. In a conventional communication terminal apparatus, such as a mobile phone or a facsimile apparatus, the dial buttons shown in FIG. 11, which are limited in their number, have to be used to enter the body of the e-mail message and the e-mail address. For example, in addition to the number "2", the input button 3 for entering the number "2" is associated with the alphabetic characters "A, B, C" and the Japanese syllabic characters (so-called "hiragana") "ka, ki, ku, ke, ko". In order to call up one of those characters, the input button 3 is pressed consecutively until the desired character appears in the display section 2.

Referring to FIGS. 12A to 12E, the following is an explanation of a method for inputting alphabetic characters. As shown in FIG. 12A, a cursor 5 is placed underneath the character "a", and the position of the cursor 5 indicates that this character is in the input state. If the desired character is "b", the character above the cursor 5 can be changed from "a" to "b", as shown in FIG. 12B, by pressing the input button 3 one more time. To confirm this character and enter the next character, the character is confirmed by pressing another input button, and the cursor 5 moves to the next position, assuming a state of standby for the next character input. However, for e-mail addresses, the symbols "@" (at sign) and "." (dot) are used, as shown in FIGS. 12C to 12E, and to enter those, it is necessary to push the input button 4 to select and call them up, which makes the task tedious.

FIG. 13 illustrates the configuration of an e-mail address, FIG. 14 illustrates several kinds of e-mail addresses, and FIG. 15 illustrates an e-mail address containing an input mistake. As shown in FIGS. 13 and 14, e-mail addresses are configured according to certain predetermined rules, and are made up of an account name (user name) specifying the user, then on the right-hand side, separated by the symbol "@", a second-level domain name indicating a company or organization, and finally, separated by the symbol "." (dot) the top-level domain name, indicating organization code and country code.

E-mail addresses are usually specified by alphanumeric characters, and as it is difficult to distinguish for example between the symbols "." (dot) and "," (comma) on the display, it happens easily that an e-mail address is entered with a typographical error, as shown in FIG. 15. Furthermore, in mobile phones, the display screen is small and the liquid crystal dots are coarse, so that it is difficult to distinguish certain characters and to judge whether the characters have been entered correctly.

Furthermore, in the conventional technology disclosed in JP-A 11-55450, all e-mail addresses are stored in a storage section, and to send out an e-mail, the desired e-mail address is selected from the e-mail addresses stored in that storage section. However, in this conventional technology, there is the problem that, as the number of stored e-mail addresses increases, it becomes increasingly troublesome to search the desired e-mail address from a plurality of e-mail addresses.

SUMMARY OF THE INVENTION

It is an object of the present invention to solve the above-described difficulties with entering e-mail addresses, and to present a communication terminal apparatus with an e-mail address input function, with which it is possible to enter e-mail addresses with a limited number of input buttons and without performing a troublesome operation.

The invention provides a communication terminal apparatus capable of sending and receiving e-mails including:

an input section for entering an e-mail address;

a storage section for storing a plurality of partial e-mail addresses; and a selection section for selecting one from among the stored partial e-mail addresses;

wherein in entering an e-mail address, a part of the e-mail address is first entered from the input section and then the partial e-mail address selected from the storage section by the selection section is combined with the part of the e-mail address entered from the input section to complete the e-mail address entry.

In accordance with the present invention, entry of an e-mail address is completed by entering a part of the e-mail address with the input section and selecting with the selection section a desired partial e-mail address from a plurality of partial e-mail addresses stored in the storage section. Storing in the storage section a second-level domain name indicating a company/organization following the symbol "@" of the e-mail address and a top-level domain name indicating organization code and country code, which are often the same in many e-mail addresses, the e-mail address can be entered by manually inputting only the account name (user name), which is particular to every e-mail address with the input section, and selecting the top-level and second-level domain names with the selection section from the storage section. Consequently, the tedious task of manually entering the entire e-mail address can be eliminated.

In the invention it is preferable that the plurality of partial e-mail addresses are stored in a predetermined order in the storage section, the selection section retrieves the partial e-mail addresses stored in the storage section in that order to select one from there among, and the order in which the selection section retrieves the partial e-mail addresses can be arbitrarily specified.

With this configuration, the storage section stores a plurality of partial e-mail addresses in a predetermined order. To select with the selection section a partial e-mail address stored in the storage section, the partial e-mail addresses are retrieved in order from the storage section one by one and displayed with the display section, and while viewing the partial e-mail addresses displayed with the display section, the viewer scrolls until the desired partial e-mail address is displayed. The order in which the e-mail addresses are retrieved can be arbitrarily specified, for example in the order of the e-mail addresses that the user uses most. Consequently, the user can retrieve the desired partial e-mail address quickly, so that the time for entering an e-mail address is shortened. This solves the difficulty of entering e-mail addresses.

In the invention it is preferable that the plurality of partial e-mail addresses stored in the storage section are classified into predetermined categories, and selection from among the stored partial e-mail addresses is carried out in response to selection of one from among the predetermined categories.

With this configuration, the plurality of partial e-mail addresses stored in the storage section are classified into predetermined categories. For example, the second-level domain name indicating company or organization name, following the symbol "@", and the top-level domain name indicating organization code and country code can be stored as a first category, and the top-level domain name only, indicating organization code and country code, can be stored as a second category. To enter an e-mail address, first, the desired category is selected with the selection section. Then, the desired partial e-mail address is selected from the selected category, forming the e-mail address. Thus, the stored partial e-mail addresses are classified into categories, so that it becomes easy to narrow the plurality of stored partial e-mail addresses down to the desired partial e-mail address. Consequently, the desired partial e-mail address can be retrieved quickly from the storage section, and the time the user needs to complete the e-mail address is shortened. This solves the difficulty of entering e-mail addresses.

BRIEF DESCRIPTION OF THE DRAWINGS

Other and further objects, features, and advantages of the invention will be more explicit from the following detailed description taken with reference to the drawings wherein:

FIG. 3 illustrates partial mail addresses that are stored in the storage section;

FIGS. 4A to 4E illustrate a method for entering an e-mail address.

FIGS. 5A and 5B illustrate a method for selecting a desired top-level domain name;

FIG. 6 illustrates how the partial e-mail addresses are classified and stored in the predetermined categories;

DETAILED DESCRIPTION OF THE PREFERRED EMBODIMENTS

Figure 1:
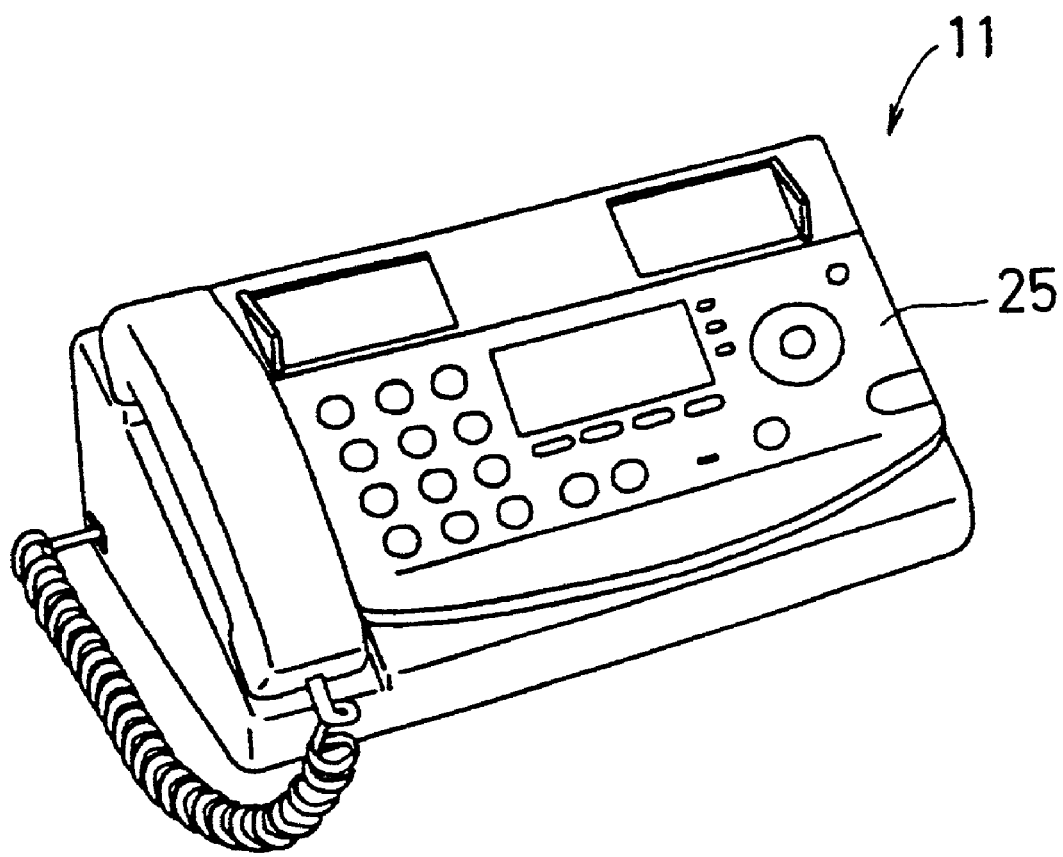
FIG. 1 is a perspective view of a facsimile apparatus 11 serving as an example of a communication terminal apparatus with an e-mail address input function in accordance with an embodiment of the present invention.

Now referring to the drawings, preferred embodiments of the invention are described below.

Figure 2:
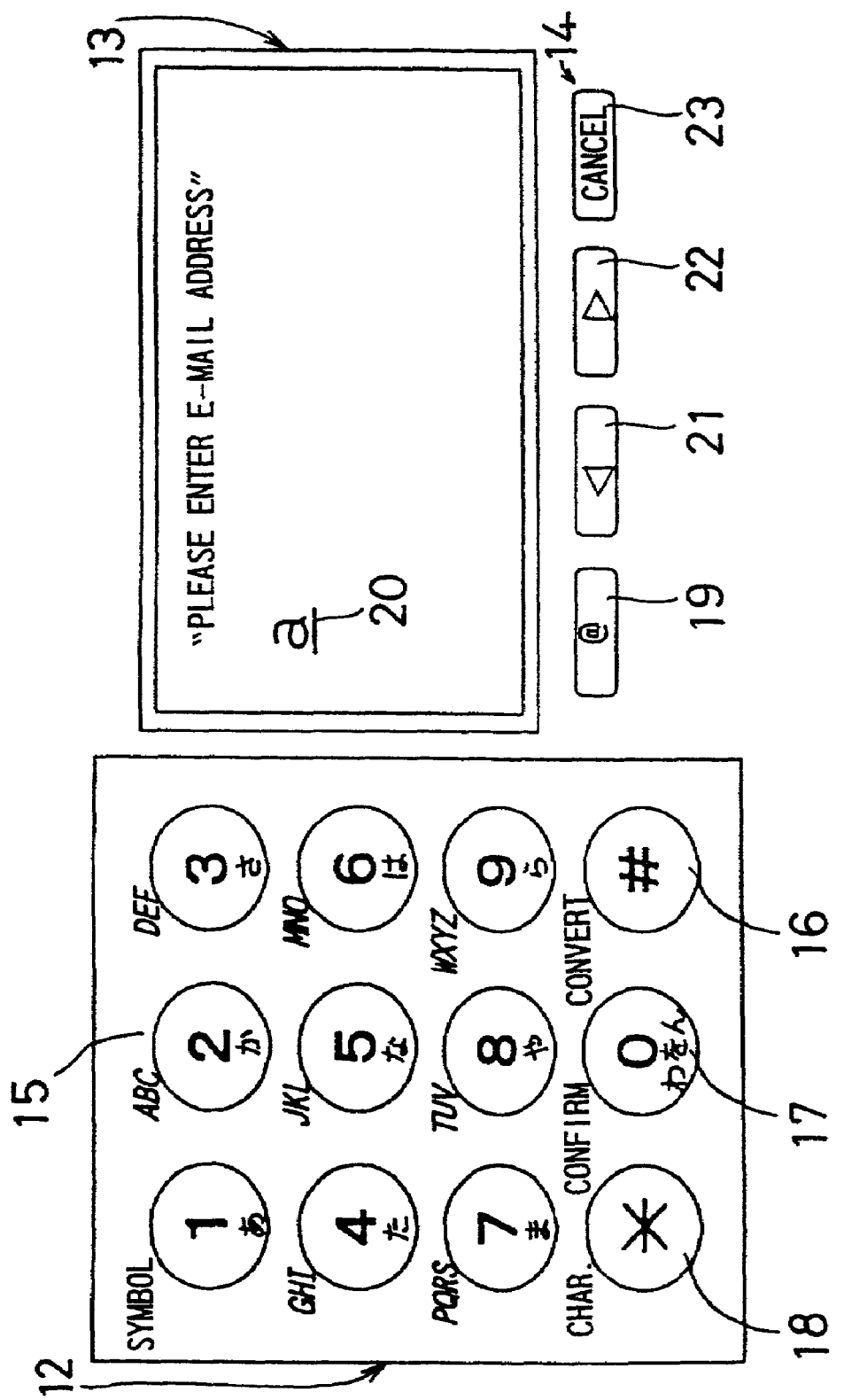
FIG. 2 shows the operation panel 25 of the facsimile apparatus 11 in detail.

FIG. 1 is a perspective view of a facsimile apparatus 11 serving as an example of a communication terminal apparatus with an e-mail address input function in accordance with an embodiment of the present invention. FIG. 2 shows the operation panel 25 of the facsimile apparatus 11 in detail. The facsimile apparatus 11 can be connected to a data communication network, such as the internet, and can send and receive electronic mail. The facsimile apparatus 11 includes an input section 12 for entering e-mail addresses, a storage section (not shown in the drawings) for storing partial e-mail addresses, a selection section 14 for calling up and selecting in order the partial e-mail addresses stored in the storage section, and a display section 13 for displaying e-mail addresses.

As shown in FIG. 2, it is possible to use for the input section 12 the same dial buttons that a regular telephone or facsimile apparatus is provided with. That is to say, the input section 12 includes nine input buttons 15, a conversion button 16, a confirmation button 17, and a character switch button 18. The nine input buttons 15 are each associated with corresponding numerical characters, alphabetic characters, Japanese syllabic characters (so-called "hiragana") and symbols. The conversion button 16 is for converting the Japanese syllabic characters entered with the input buttons 15 into Japanese "katakana" characters or Chinese "Kanji" characters. The confirmation button 17 is for confirming the "katakana" character or the Chinese character after conversion with the conversion button 16. The character switch button 18 is for switching the characters that are entered by pressing the input buttons 15 between numerical, alphabetic and Japanese "hiragana" characters.

FIG. 3 illustrates the partial mail addresses that are stored in the storage section. As shown in FIG. 3, the storage section stores as the partial mail addresses a plurality of top-level domain names representing organization codes and country codes. These top-level domain names are ordered in a predetermined priority order, and listed in that order starting with the highest priority. The priority order can be arbitrarily set by the user, and can be switched to the order of the highest usage frequencies or to alphabetic order, for example. It is also possible to automatically rearrange the list in order of the highest usage frequencies, based on the usage frequencies.

The display section 13 is for example a liquid crystal display screen, and displays the characters that are entered with the input section 12 or the top-level domain names that are retrieved from the storage section.

The selection section 14 includes an at-sign button 19 for entering the symbol "@" that is used in every e-mail address, an advance button 22 for advancing the cursor 20 displayed in the display section 13 to the next position, a back-up button 21 for backing up the cursor 20 to the previous position, and a delete button 23 for deleting the character above the cursor 20.

Referring to FIGS. 4A to 4E, the following is an explanation of a method for entering an e-mail address. FIGS. 4A to 4E illustrate this method for entering an e-mail address. The present embodiment explains a case where the e-mail address of the recipient to which an electronic mail is sent is "abc@faxmail.com". This e-mail address consists of the character string "abc" as the account name (user name), the symbol "@", the character string "faxmail" as the second-level domain name representing company or organization, and the character string ".com" as the top-level domain name representing the organization code and the country code.

First, after pressing the input button 15, the confirmation button 17 is pressed. Thus, the character "a" is confirmed, and the cursor 20 moves to the next position. To enter the next character "b", the input button 15 is pressed again. Thus, as shown in FIG. 4A, the character "a" is displayed above the cursor 20, and pushing the input button 15 again, the character "b" is displayed above the cursor 20, as shown in FIG. 4B. Repeating this operation, the account name "abc" is entered.

After the account name "abc" has been entered, the at-sign button 19 is pressed, and the symbol "@" is inserted after the account name "abc", as shown in FIG. 4C. Then, as shown in FIG. 4D, the second-level domain name "faxmail" is entered in the same manner as the account name "abc".

To enter the top-level domain name ".com" after the second-level domain name "faxmail", first, the at-sign button 19 is pressed twice. Thus, the top-level domain name ".com", which is at the highest priority position in the list of top-level domain names stored in the storage section, is displayed, as shown in FIG. 4E. In the present embodiment, the desired top-level domain name is ".com", which is at the highest priority position, so that it can be confirmed by pressing the confirmation button 17 while the top-level domain name ".com" is being displayed in the display section 13. Thus, after the second-level domain name "faxmail", the desired top-level domain name ".com" is inserted, completing the e-mail address. In this manner, with the facsimile apparatus 11 of the present invention, it is not necessary to enter all of the e-mail address by hand, which solves the difficulty of entering e-mail addresses.

Referring to FIGS. 5A and 5B, the following is an explanation of a method for selecting a top-level domain name. FIGS. 5A and 5B illustrate this method for selecting a desired top-level domain name from a plurality of top-level domain names. As mentioned before, when the at-sign button 19 is pressed twice, the top-level domain name ".com", which has the highest priority, is retrieved from the storage section and displayed in the display section 13. This situation is shown in FIG. 5A. Then, pressing the forward button 22 once, the top-level domain name ".co.jp", which has the second highest priority, is retrieved from the storage section and displayed, as shown in FIG. 5B, and pressing the forward button 22 once again, the top-level domain name ".ne.jp", which has the third highest priority, is retrieved and displayed. Thus, pressing the forward button 22 repeatedly, top-level domain names with lower priority can be retrieved in order from the storage section and displayed on the display section 13. Thus, as the top-level domain names are retrieved in order starting with the highest priority, the desired top-level domain name can be retrieved fast, and the time to complete the mail-address is shortened. Consequently, this solves the difficulty of entering e-mail addresses.

Furthermore, if the display has been advanced too far, it is possible to back up by pressing the back-up button 21 to retrieve and display the top-level domain name with the next higher priority. After all top-level domain names stored in the storage section have been displayed, the state of the lowest priority is assumed, in which nothing is displayed, and the user can see that all stored top-level domain names have been displayed. If in this state of empty display, the forward button 22 is pressed once again, the top-level domain name ".com" with the highest priority is retrieved and displayed once again.

The storage section can also store second-level domain names and account names. Storing second-level domain names and account names as well is very convenient if electronic mail is often sent to the same person. But indiscriminately storing partial e-mail addresses including a top-level domain name, partial e-mail addresses including a top and a second-level domain name, and e-mail addresses including a top-level domain name, a second-level domain name and an account name causes confusion and makes it even more difficult to retrieve the desired address. Therefore, it is preferable that these data are grouped together and stored in predetermined categories.

Figure 7:
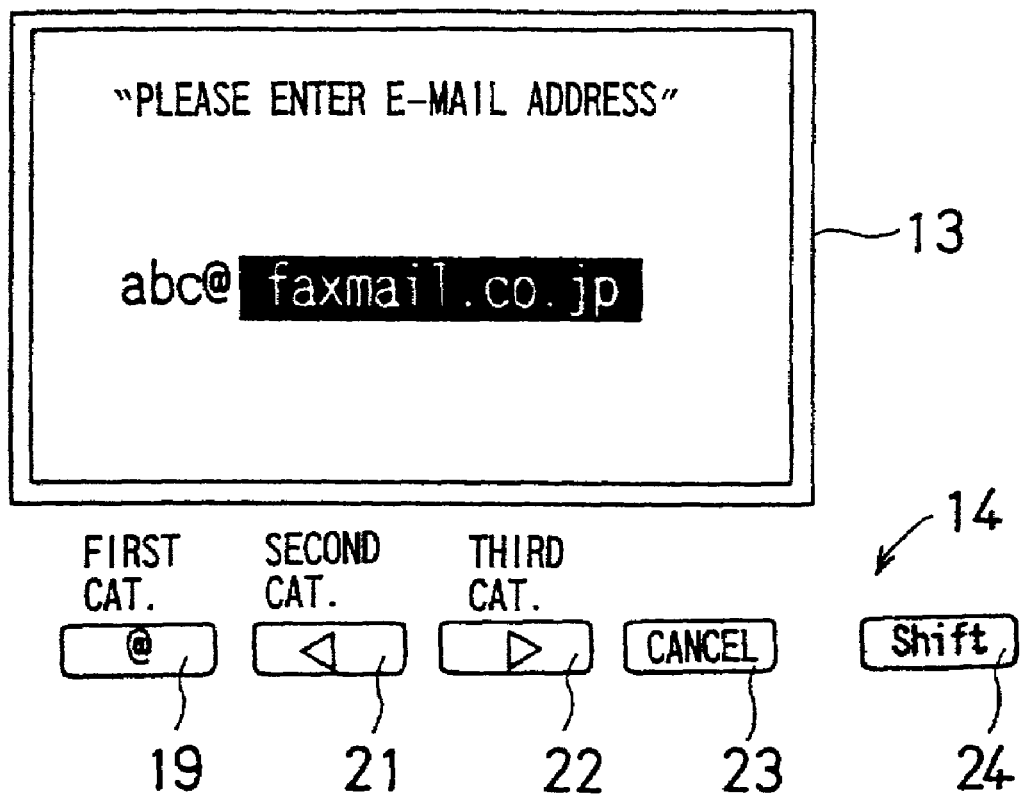
FIG. 7 illustrates a method for changing the category.

FIG. 6 illustrates how the partial e-mail addresses are classified and stored in the predetermined categories, and FIG. 7 illustrates a method for changing the category. As shown in FIG. 6, in the present embodiment, the partial e-mail addresses can be grouped and stored in three categories, namely a first category including the top-level domain name only, a second category including the top-level domain name and the second-level domain name, and a third category including the account name, the top-level domain name and the second-level domain name. Furthermore, the first to third categories are provided with priority orders as described above, and are listed in order starting with the highest priority. As described above, this priority order can be arbitrarily chosen by the user.

As shown in FIG. 7, the selection section 14 includes a shift button 24 for switching between the first and third categories, and a possible configuration is that the at-sign button 19 also has the function to switch into the first category, the back-up button 21 also has the function to switch into the second category, and the forward button 22 also has the function to switch into the third category. If the at-sign button 19 is pressed while holding down the shift button 24, the first category is selected, and only the top-level domain names are retrieved and displayed. If the back-up button 21 is pressed while holding down the shift button 24, the second category is selected, and top-level and second-level domain names are retrieved and displayed, as shown in FIG. 7. If the forward button 22 is pressed while holding down the shift button 24, the third category is selected, and complete e-mail addresses including account names and top-level and second-level domain names are retrieved and displayed. Selecting the desired category of the first to third categories, items can be retrieved in order from the storage section and displayed by pressing the forward button 22, as described above. Thus, by grouping the partial e-mail addresses into categories and storing them, it becomes easy to retrieve the desired partial e-mail address from a plurality of partial e-mail addresses, and the time needed to complete an e-mail address can be shortened. Consequently, this solves the difficulty of entering e-mail addresses.

The method for classifying the partial e-mail addresses is not limited to the above, and it is also possible to classify e-mail addresses as desired by the user. For example, if the user classifies e-mail addresses into those for business and those for private use, then addresses for business use can be classified and stored as the first category, and addresses for private use can be classified and stored as the second category.

Figure 8:
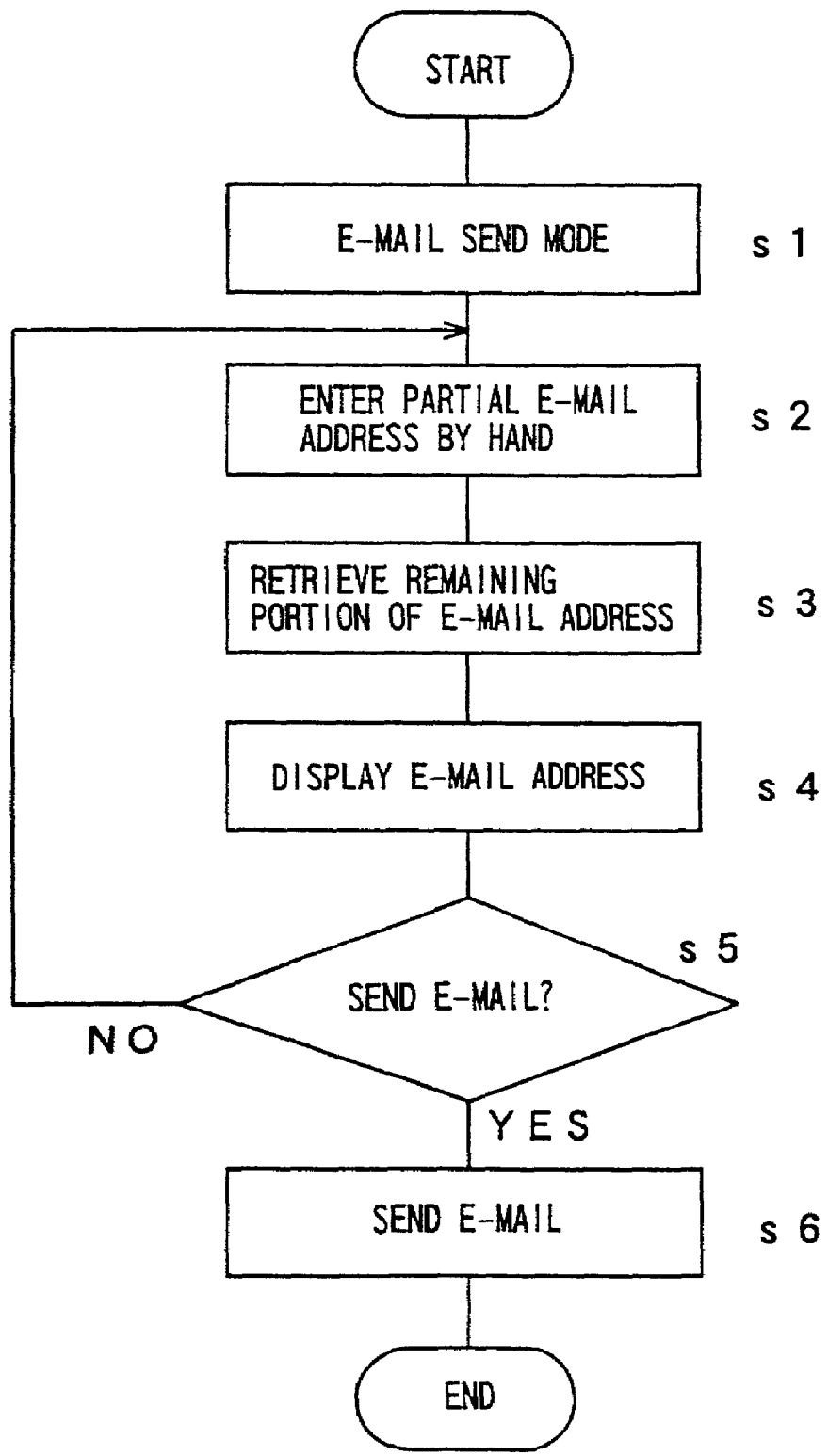
FIG. 8 is a flowchart illustrating the sending of an e-mail with the facsimile apparatus 11.

FIG. 8 is a flowchart illustrating the sending of an e-mail with the facsimile apparatus 11 of this embodiment. In Step s1, when the facsimile apparatus 11 is switched into an e-mail sending mode for sending electronic mail, the procedure advances to Step s2, in which a partial e-mail address is entered by hand with the input section 12. If a complete e-mail address is retrieved from the third category, then this Step s2 can be omitted. Then, the procedure advances to Step s3, and, as described above, the remaining portion of the e-mail address is retrieved with the selection section 13 from the storage section and entered, and the procedure advances to Step s4. In step s4, the e-mail address displayed in the display section 13 is confirmed, and the procedure advances to Step s5, in which it is decided whether to send out the e-mail. If it is decided to send out the e-mail, the procedure advances to Step s6, and the e-mail is sent out. If it is decided in Step s5 that the e-mail is not sent out, the procedure returns to Step s2.

Figure 9:
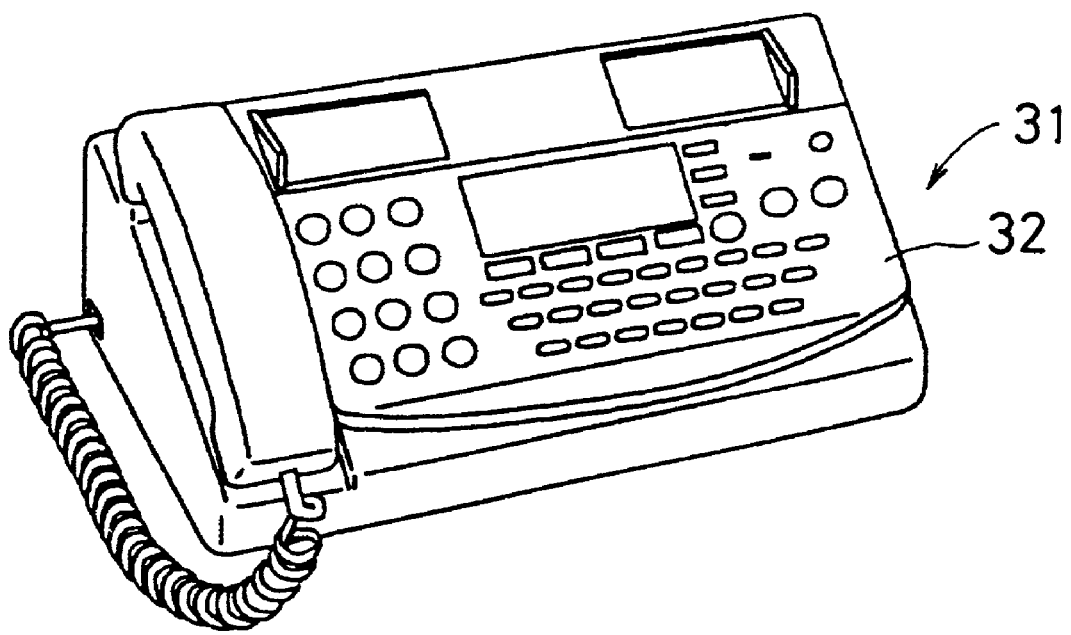
FIG. 9 is a perspective view of a facsimile apparatus 31, which is an example of a communication terminal apparatus with an e-mail address input function according to another embodiment of the present invention.
Figure 10:
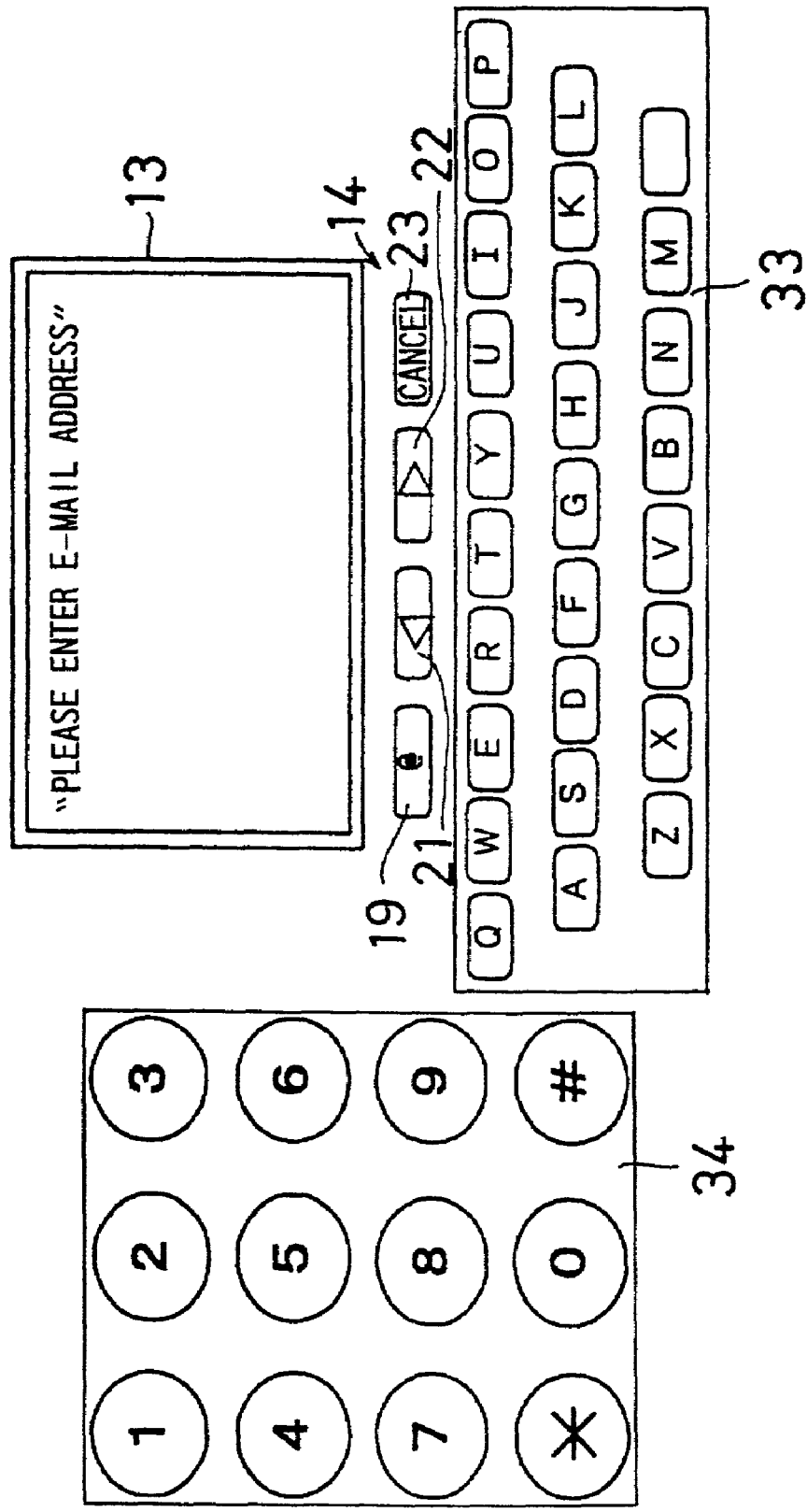
FIG. 10 is a drawing showing the details of the operation panel 32 of the facsimile apparatus 31.
Figure 11:
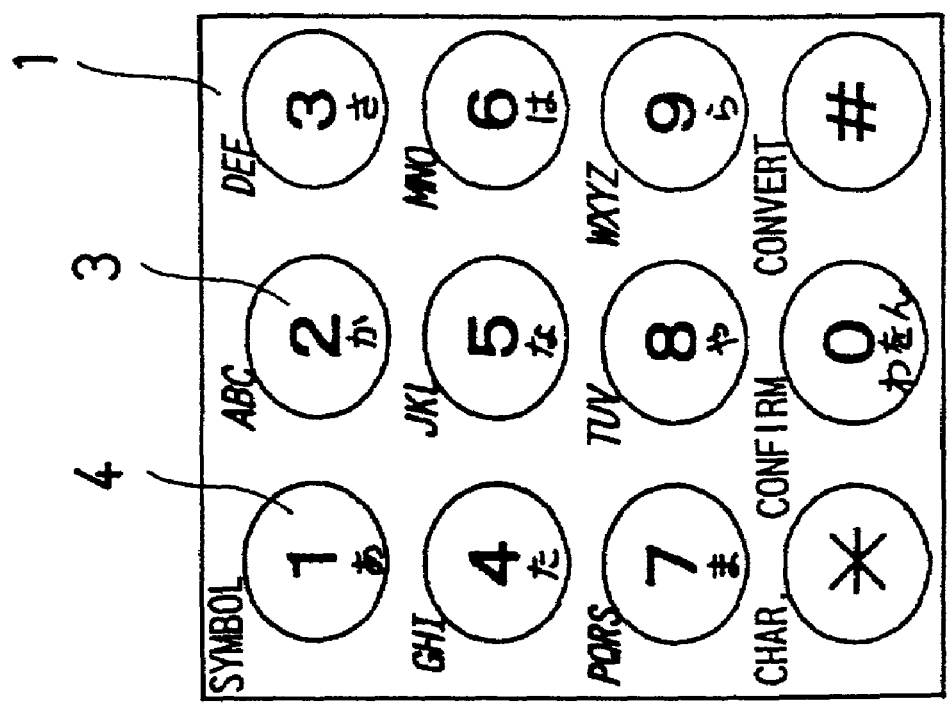
FIG. 11 shows an input section 1 and a display section 2 of a conventional communication terminal apparatus.
Figure 12A:
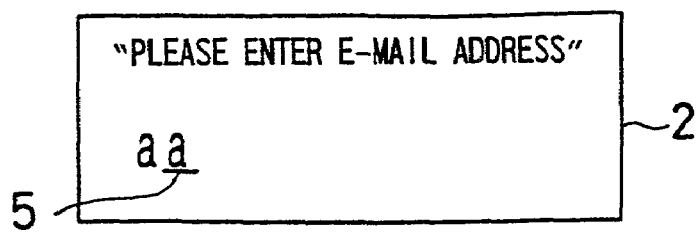
FIGS. 12A to 12E illustrate a conventional method for entering an e-mail address.
Figure 12B:
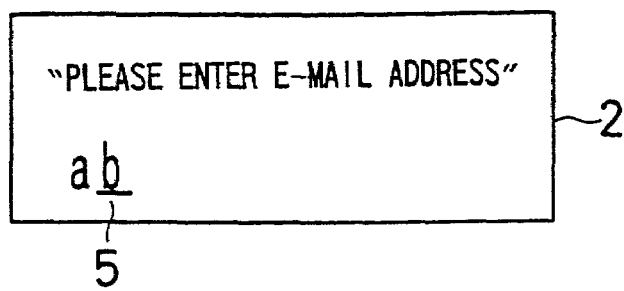
Figure 12C:
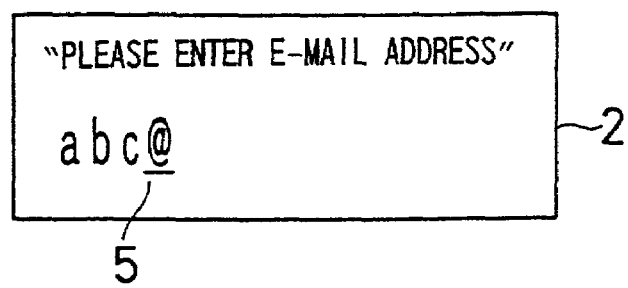
Figure 12D:
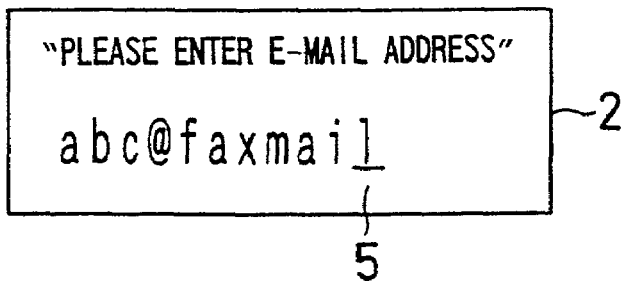
Figure 12E:
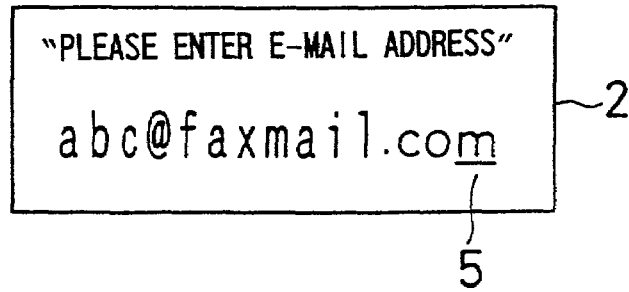
Figures 13, 14, 15:
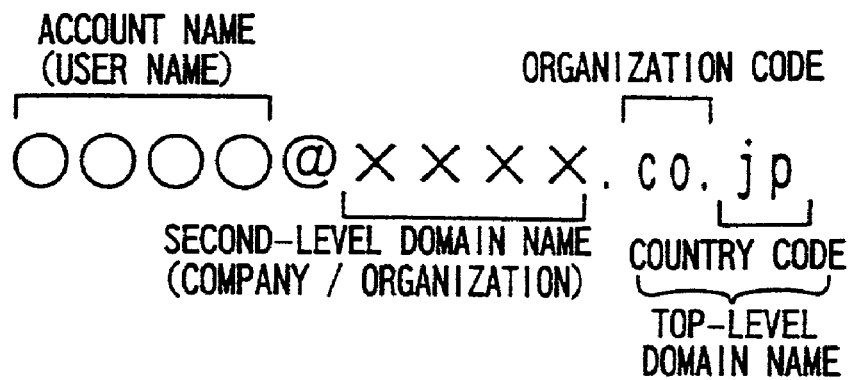
FIG. 13 illustrates the configuration of an e-mail address.
FIG. 14 illustrates several kinds of e-mail addresses.
FIG. 15 illustrates an e-mail address containing an input mistake.

FIG. 9 is a perspective view of a facsimile apparatus 31, which is an example of a communication terminal apparatus with an e-mail address input function according to another embodiment of the present invention, and FIG. 10 is a drawing showing the details of the operation panel 32 of this facsimile apparatus 31. A feature of the facsimile apparatus 31 of this embodiment is that its dial buttons 34 are not provided with a character input function, but the facsimile apparatus 31 is provided with a separate character input section 33 for inputting alphabetic characters. Consequently, the facsimile apparatus 31 of this embodiment has the advantage that it is easy to input characters, because it has character input buttons for inputting alphabetic characters, just like the keyboard of a personal computer.

In the foregoing, the communication terminal apparatus with e-mail address input function of the present invention has been explained taking a facsimile apparatus as an example, but the communication terminal apparatus can also be realized as a mobile phone.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A communication terminal apparatus capable of sending and receiving e-mails comprising:
   an input section for entering an e-mail address;
   a storage section for storing a plurality of partial e-mail addresses, at least one of the partial e-mail addresses stored in the storage section comprising two or more different e-mail address parts; and
   a selection section for selecting one from among the stored partial e-mail addresses;
   wherein in entering an e-mail address, a portion of the e-mail address is first entered from the input section and then the partial e-mail address selected from the storage section by the selection section is combined with the portion of the e-mail address entered from the input section to complete the e-mail address entry, and
   wherein the plurality of partial e-mail addresses is stored in a predetermined order in the storage section, the selection section retrieves the partial e-mail addresses stored in the storage section in that order to select one from there among, and the order in which the selection section retrieves the partial e-mail address can be arbitrarily specified.

2. The communication terminal apparatus of claim 1, wherein the plurality of partial e-mail addresses stored in the storage section is classified into predetermined categories, and selection from among the stored partial e-mail addresses is carried out in response to selection of one from among the predetermined categories.

3. The communication terminal of claim 1, wherein the partial e-mail addresses stored in the storage section are organized into categories.

4. The communication terminal of claim 3, wherein the categories include a category for partial e-mail addresses comprising a top-level domain name and a sub-level domain name.

5. The communication terminal of claim 3, wherein the selection section comprises one or more keys usable to select one of the categories.

6. The communication terminal of claim 1, wherein the selection section comprises one or more keys usable to step forward and backward through the partial e-mail addresses.

7. The communication terminal of claim 1, embodied as a mobile telephone.

8. The communication terminal of claim 1, embodied as a facsimile apparatus.

* * * * *